United States Patent [19]

Nebashi

[11] Patent Number: 5,140,569
[45] Date of Patent: Aug. 18, 1992

[54] MAGNETO OPTICAL RECORDING SYSTEM WITH A LASER MOUNTED ON A SLIDER

[75] Inventor: Satoshi Nebashi, Suwa, Japan

[73] Assignee: Seiko Epson Corporation, Tokyo, Japan

[21] Appl. No.: 437,009

[22] Filed: Nov. 15, 1989

[30] Foreign Application Priority Data

Nov. 15, 1988 [JP] Japan .......................... 63-287921
Jan. 10, 1989 [JP] Japan .......................... 1-3217

[51] Int. Cl.$^5$ ..................... G11B 11/10; G11B 11/00
[52] U.S. Cl. ............................ 369/13; 360/59; 360/103; 360/114; 369/44.14
[58] Field of Search ............ 360/59, 114, 103; 369/13, 44.14; 365/122

[56] References Cited

U.S. PATENT DOCUMENTS

| | | | |
|---|---|---|---|
| 4,101,947 | 7/1978 | Lambeth | 360/114 X |
| 4,592,037 | 5/1986 | Ohnuki | 369/44.14 |
| 4,633,450 | 12/1986 | Gueugnon | 369/13 |
| 4,737,947 | 4/1988 | Osato et al. | 365/122 X |
| 4,750,152 | 6/1988 | Yonekubo et al. | 369/13 X |
| 4,788,671 | 11/1988 | Kanda | 369/13 |
| 4,862,437 | 8/1989 | Okada | 369/13 |
| 4,890,178 | 12/1989 | Ichihara | 369/13 X |
| 4,959,820 | 9/1990 | Horimai et al. | 360/114 X |
| 4,974,219 | 11/1990 | Korth | 369/13 |
| 5,020,041 | 5/1991 | Nakao et al. | 360/114 X |

FOREIGN PATENT DOCUMENTS 0189751   7/1990   Japan ......................... 360/59

OTHER PUBLICATIONS

Ukita, Isomura, and Katagiri, Dynamic Readout Performance and Signal Fluctuation Suppression Method for a Micro-Optical Head, E71 *The Transactions Of The IFICE* No. 4, pp. 323-326; Mar. 28, 1988.

Primary Examiner—Stuart S. Levy
Assistant Examiner—Joseph A. Rhoa
Attorney, Agent, or Firm—Blum Kaplan

[57] ABSTRACT

A recording system for use with a recording disk including a slider positioned near the surface of the recording disk a small distance away therefrom is provided. The slider traverses the disk by displacement to and away from the center of the disk. A laser (603) light source is affixed to the slider (604) for projecting a light beam through the recording disk to a photosensor positioned in optical communication with the laser light source. The disk is rotated by a disk drive.

6 Claims, 4 Drawing Sheets

MAGNETO OPTICAL RECORDING SYSTEM WITH A LASER MOUNTED ON A SLIDER

BACKGROUND OF THE INVENTION

This invention relates to an optical recording system, and in particular, to a recording system which uses an optical recording disk and optical head to record, reproduce and erase data.

FIG. 9 illustrates a conventional optical recording system, generally indicated as 900, for reading and recording a magneto optical disk 901. For recording, a laser diode 906 is provided as a light source and outputs a light beam 911 which is collimated by a collimater 905. The collimated beam passes through a one-way mirror 903 to a second mirror 912 which directs the light beam through an objective lens 902 which focuses the light upon magneto optical disk 901.

For reading magneto optical disk 901, light is reflected back through objective lens 902 and reflected by mirror 912 towards one-way mirror 903. Light returning in the opposite direction as light beam 911 through one-way mirror 903 is directed away from laser diode 906 towards a wave plate 907. The light then passes through wave plate 907 and a lens 909 to a polarized beam splitter 908 which splits the beam. Polarized beam splitter 908 divides the beams. A portion of the beam is received by each respective photo diode 910. The signals from photo diodes 910 are then converted to a machine interpretable form and compared with each other.

The prior art recording system has been satisfactory. However, it suffers from the disadvantage that it provides a slow recording media access time and data transfer rate.

An optical recording head constructed as a floating head such as that used in hard disk drives was recently presented at an academy by Mr. Ukita of Nippon Telephone and Telegram and was published in Japanese application No. 41509/87. This optical head was a floating head similar to those used in a hard disk drive, but was made light weight to improve access speed approaching limits only available with hard disks. This device was also satisfactory. However, the device was not adaptable to a magneto optical disk. Additionally, this recording system can not perform over writing.

Several studies were conducted and published concerning improvements of these conventional optical heads. A study of a thin film optical head was presented in an abstract of the spring lecture meeting of the Japan Applied Physics Association 28p-Ze-13, 1987. A study of a slider optical head which was similar to a magnetic head for hard disk drives was presented in Trans. IEICE, E71, p. 323, 1988. These studies were directed to improving access speed by decreasing head weight.

A further study showed that a data transfer rate could be improved by combining an optical head and a magnetic head and was made public in an abstract of the spring lecture meeting of the Japan Applied Physics Association 21a-Zq-7.

Magneto optical media was studied and the results were made public in an abstract of the Japan Applied Physics Association 28p-ZL-3. In this study, a magneto optical media can be overwritten by using a two layered thin recording film. An improvement for a recording medium which may be overwritten using phase change material was demonstrated in the Japan Optical Memory Symposium 1988, p. 81.

These conventional techniques were satisfactory. However, they suffer from several disadvantages. First, a recording system using a thin film optical head or slider head is not able to produce information on magneto optical media. A magneto optical medium using two layered recording film results in a high manufacturing cost and requires a strong magnet to initially record on the film. Lastly, an overwriting phase change medium suffers from weak stability.

Accordingly, it is desirable to provide a recording system which overcomes the disadvantages of the prior art and provides an advanced recording system having high access speed, high speed data transfer, is capable of reproducing magneto optical data and is capable of overwriting previously recorded data.

SUMMARY OF THE INVENTION

Generally speaking, in accordance with the invention, a recording system for recording on a recording disk includes a drive for rotating the disk, a slider positionable a small distance apart from the surface of the recording disk, a laser light source on the slider for projecting a light beam onto the recording disk and a photo sensor disposed on the opposite side of the recording disk from said laser light source for detecting light emitted by the laser light source. A magnetic coil is positioned adjacent the laser source for providing a magnetic field bias. Additionally, a polarizer may be operatively linked to the photo sensor for polarizing the light prior to receipt of the light by the photo sensor. Both the photo sensor and the polarizer may be divided at its surface so that there is a one to one correspondence between the number of polarizer sections and the number of sensor sections.

Accordingly, it is an object of the invention to provide an improved recording system.

Another object of the invention is to provide a magneto optical recording system in which overwriting on the recording medium may be performed.

Yet another object of the present invention is to provide a magneto optical recording system having an access speed and data transfer speed as high as that of a hard disk drive.

Still other objects and advantages of the invention will in part be obvious and will in part be apparent from the specification.

The invention accordingly comprises the features of construction, combinations of elements, and arrangement of parts which will be exemplified in the constructions hereinafter set forth and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
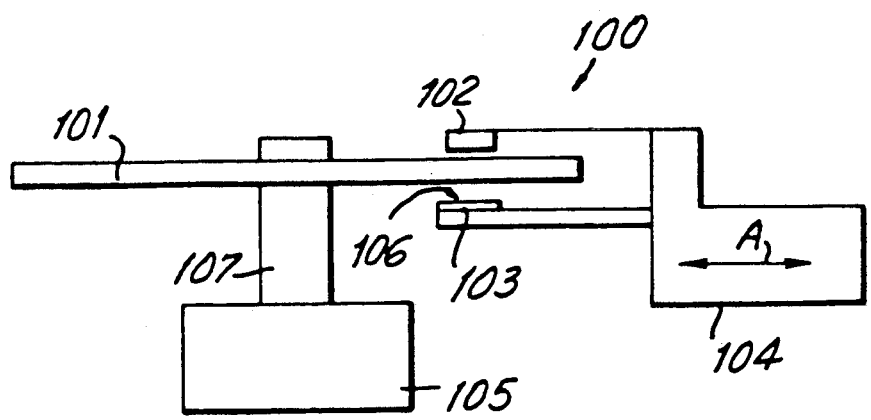
FIG. 1 is a simplified side elevational view of a recording system constructed in accordance with the invention.

Reference is made to FIG. 1 wherein a recording system, generally indicated as 100, constructed in accordance with the invention is shown. A recording disk 101 is mounted on a spindle 107 of a spindle motor 105. A movable actuator 104 supports a slider 102, having a laser diode affixed to the end thereof for position close to the surface of disk 101. Slider 102 is constructed in the same manner as those used in a magnetic head for a hard disk drive. A photo sensor 103 is supported on actuator 104 and is positioned on the opposite side of disk 101 to cooperate optically with the laser diode mounted on slider 102.

A laser beam from the laser diode mounted on slider 102 passes through recording disk 101, such as an optical disk, and is received by photo sensor 103. Actuator 104 moves in either direction of arrow A. This allows the laser diode of slider 102 to scan across all the tracks of recording medium 101.

In recording system 100, recording disk 101 can be a write once medium, a magneto optical medium or a phase change medium. In a write once media, a written mark is a pit which is melted by a laser spot or a domain in which phase is changed by a laser spot. Phase change media are also rewritable media. A magneto optical media is still another type of rewritable media and the written mark is a magnetic domain.

Figure 2:
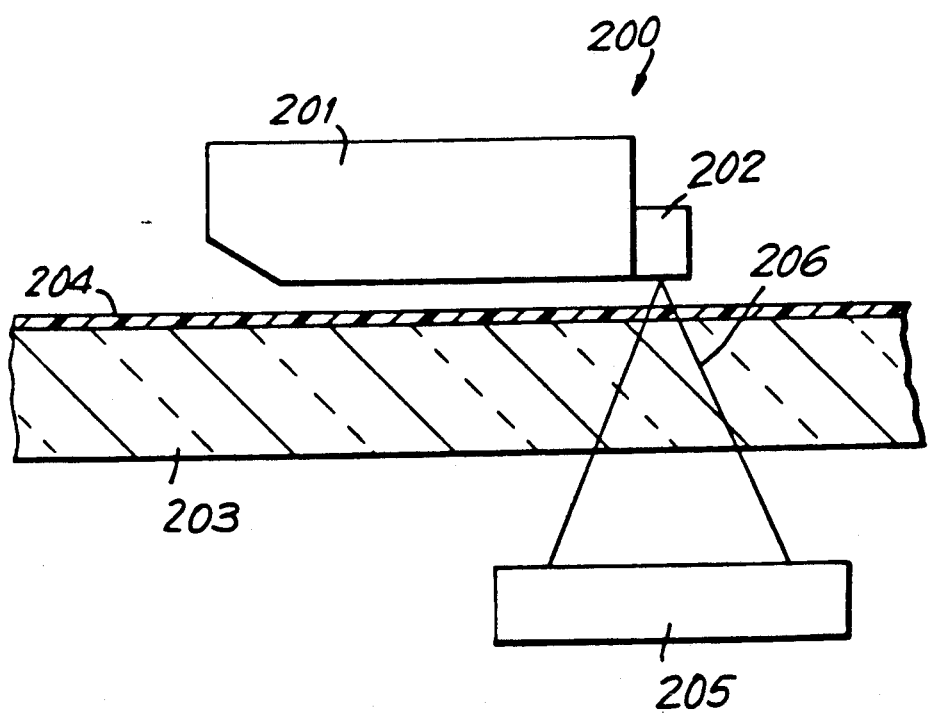
FIG. 2 is a cross-sectional view of a slider, laser source and recording medium positioned in accordance with the invention.

Reference is now made to FIG. 2 in which a cross-section of a slider 201 supporting a laser source 202 and a corresponding photo sensor 205 for re-recording and/or writing to an optical disk 203 is shown. Laser source 202 can be a laser diode, or the like. A photo sensor 205 is positioned to be optically coupled with laser source 202.

An Optical disk 203 has a recording layer 204 on the surface near slider 201 and is positioned between laser source 202 and photo sensor 205. Laser source 202 projects a read/write beam 206 through recording layer 204 and optical disk 203 which is received by photo sensor 205. Recording layer 204 can be a recording film which may be used as a mirror for the laser generator.

Figure 3:
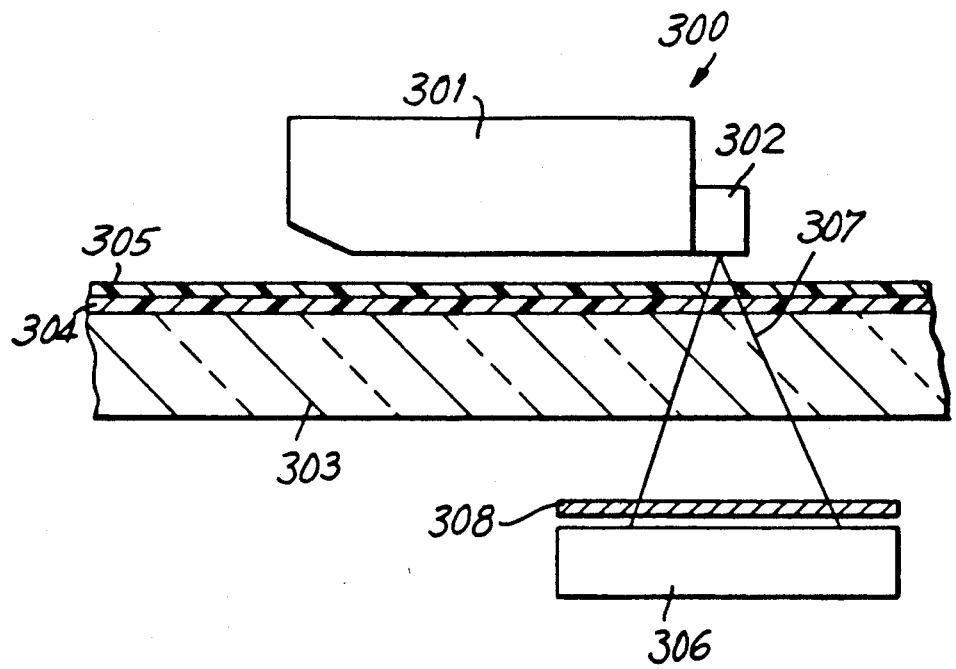
FIG. 3 is a cross-sectional view of the recording and reproducing head for a magneto optical recording system constructed in accordance with the invention.

FIG. 3 shows a magneto optical system 300, for reading and/or writing to a magneto optical disk 303 including a slider 301 having a laser source 302 mounted thereon. A photo sensor 306 is optically coupled to laser source 302 and separated a distance from slider 301. A polarizer 308 is disposed between laser source 302 and photo sensor 306.

Magneto optical disk 303 includes a substrate 309, a recording layer 304 thereon and a protective layer 305 over recording layer 304. A read/write beam 307 projected by laser source 302 passes through protective layer 305, recording layer 304 and magneto optical disk substrate 309. Beam 307 then passes through polarizer 308 and is received by photo sensor 306. Magneto optical system 300 is able to reproduce magneto optical data signals.

Figure 6:
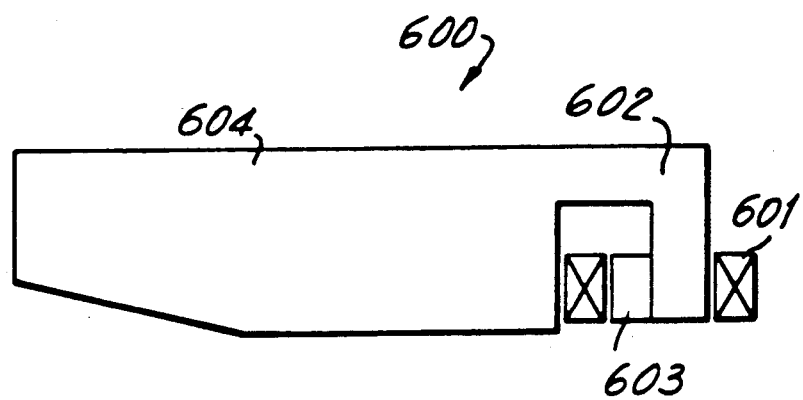
FIG. 6 is a cross-sectional view of a slider for a magneto optical disk recording head constructed in accordance with the invention.

Laser source 302 includes a magnetic coil to provide a magnetic field bias as shown in the exploded view of a laser source 600 of FIG. 6. A slider 604 has a magnetic core pole 602 mounted at one end and a laser diode 603 mounted on magnetic core pole 602. A magnetic coil 601 is then wrapped about laser diode 603 and magnetic core pole 602 to provide a magnetic field bias.

Recording is conducted by applying current through magnetic coil 601 while continually outputting a laser light from laser diode 303 or providing a pulse synchronized with the recording signal and reversing the magnetic bias of magnetic coil 601 in synchronism with the recording signal pulses. Because recording is conducted by modulation of magnetic bias overwrite is possible.

Figure 4:
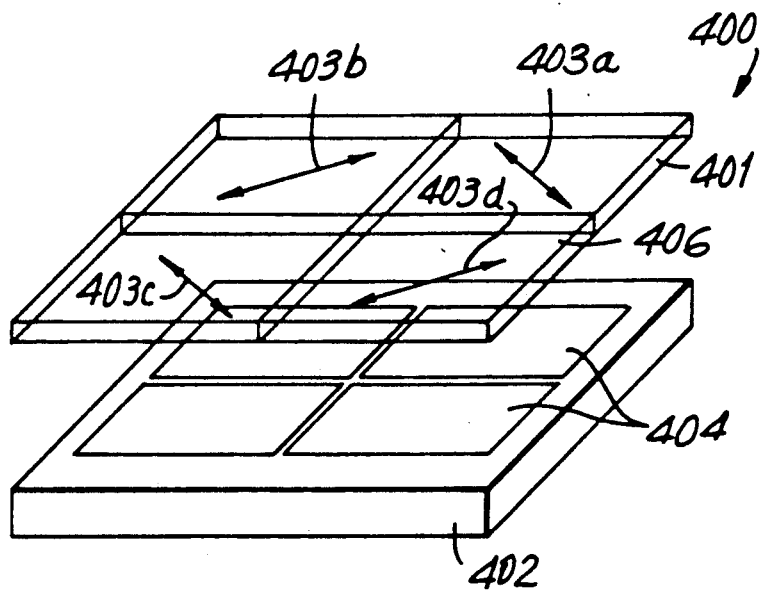
FIG. 4 is an exploded perspective view of a photo-sensor and polarizer suitable for use in the recording system constructed in accordance with the invention.

Reference is now made to FIG. 4 in which a photo sensor 402 and a polarizer 401, for receiving a laser beam are shown. Photo sensor 402 is divided into four sections 404. Polarizer 400 is also divided into four sections 406. Each polarizer section 406 has an individual polarizing axis indicated by arrows 403a, b, c and d. The axis shown by arrows 403 extend along the diagonal of each polarizer section 406 and the angle between adjacent axes 403 is a right angle. The number of divided sections 401 equals the number of divided sections 404 of photo sensor 402.

Figure 5:
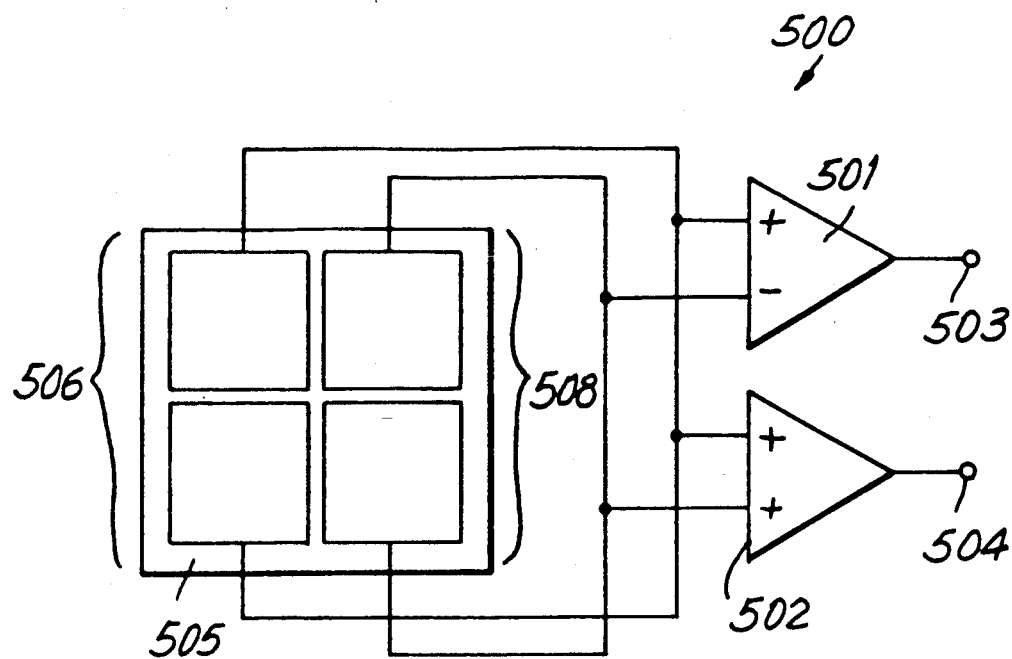
FIG. 5 is a circuit diagram of a photo-sensor suitable for use in the recording system constructed in accordance with the invention.

Reference is now made to FIG. 5 in which a data signal composition circuit, generally indicated as 500, constructed in accordance with the invention is illustrated. Data composition circuit 500 includes a divided quadrant photo diode 505. A magneto optical signal is reproduced by taking the difference of the two sums of the outputs from two diagonally positioned quadrants of quadrant photo diode 505. Accordingly, quadrants within the same column of photo diode 505 are electrically coupled to each other. A differential amplifier 501 receives the input from a first column of divided quadrants 506 at its plus terminal and an input from a second column of quadrants 508 at its negative terminal and produces a magneto optical signal at its output 503. A sum amplifier 502 receives an output from quadrant column 506 at one input and output from quadrant column 508 at its other input and produces a prerecorded signal at output 504.

Figure 9:
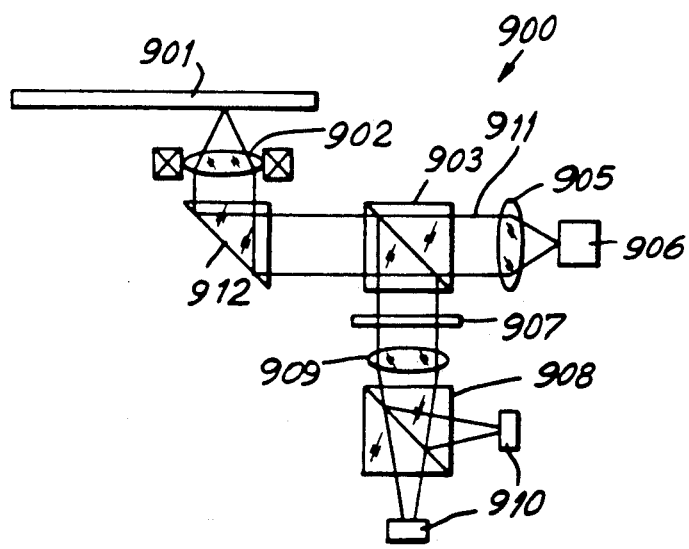
FIG. 9 is a schematic diagram of an optical head constructed in accordance with the prior art.

An output from a single divided quadrant has the same intensity as the output of its diagonal quadrant and is different from that of its adjacent non-diagonal quadrant. Therefore, the difference of the sums of the output is twice as strong as the sum signal. Composition circuit 500 reduces almost all of the noise having the same phase ingredient and has the same effect as the differential detection of conventional magneto optical recording head 900 of FIG. 9. Additionally, a prerecorded signal from pits formed on the recording disk is reproduced by the sum of all the parts of the divided quadrant diode 505.

The invention will now be explained in greater detail with reference to the following examples. These examples are presented for the purpose of illustration only, and are not intended to be construed in a limiting sense.

EXAMPLE 1

Figure 7:
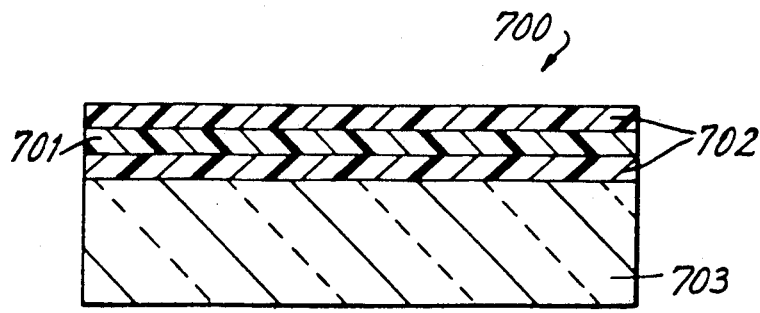
FIG. 7 is a cross-sectional view of a recording disk constructed in accordance with the invention.

As shown in FIG. 7, an optical disk 700 was prepared having recording and reproducing characteristics tested in recording system 200. Optical disk includes a substrate 703 formed of a glass disk having a diameter of 130 mm. A first protective layer 702 is disposed on the surface of substrate 703. A recording film 701 is formed as a layer above first protective film 702 and a second protective film 702 forms a layer above recording film 701. Recording film 701 is protected above and below by a protective film 702. Recording film 701 is germanium-stibium-tellium (GeSbTe) having a thickness of 40 nm. Protective layers 702 are formed of aluminum-silicon-nitride (AlSiN) having a thickness of 100 nm.

The glass disk forming substrate 703 was rotated at 3600 rpm. 7 MHz square waves were recorded on the disk at a radius of 30 mm. A 47 dB signal was reproduced. The domain of the written mark was 1.1 $\mu$m. The write laser power was 9.0 mW with a recording pulse width of 50 ns. The read laser power was 2.0 nW.

EXAMPLE 2

Figure 8:
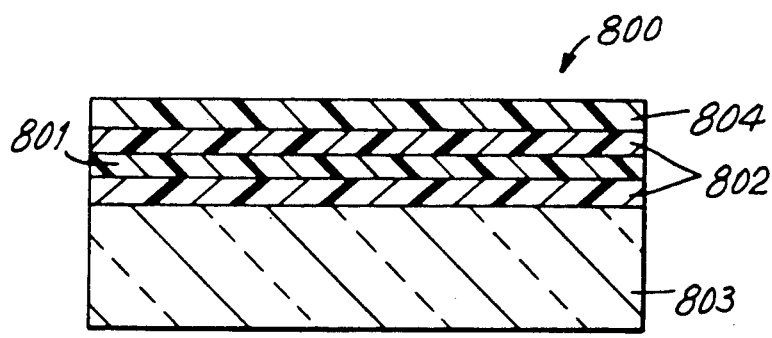
FIG. 8 is a cross sectional view of a recording disk constructed in accordance with another embodiment of the invention.

A magneto optical disk 800 as shown in FIG. 8 was prepared and its recording and reproducing property was tested in accordance with recording system 300 using photo sensor 402 and a composition circuit 500. Disk 800 includes a substrate 803 having a protective film 802 thereon and a recording film 801 over protective film 802. Recording film 801 is then covered with a second protective film 802 to form a layer above recording film 801. A protective resin 804 forms a layer above protective film 802.

Recording film 801 of magneto optical disk 800 is a terbium-iron-cobalt (TbFeCo) film having a thickness of 40 nm. Protective film 802 was formed of siliconnitride (SiN) having a thickness of 80 nm. Protective resin 804 is a photo polymerized resin protective layer having a thickness of 5 $\mu$m. The diameter of substrate 803 is 130 mm.

Disk 800 was rotated in recording system 300 at 1800 rpm. A 45 dB C/N was obtained by recording system 300 when a 4 MHz square wave signal was written and read from the disk. The track width of the disk was 1.2 $\mu$m. The signals were recorded and reproduced using a write laser which continuously irradiated at a power of 5.5 mW. The write magnetic field had an amplitude of 200 Oe and was modulated at, 4 MHz and had duty ratio of 50%. The read laser power was 1.5 mW while the read magnetic field was 0.

EXAMPLE 3

A magneto optical disk 800 formed of a recording film 801 of neodimium-dysprosium-iron-cobalt (NdDyDeCo) having a thickness of 50 nm was utilized in recording system 300. Protective layers 802 were AlSiN having a thickness of 100 nm. Protective resin layer 804 was formed of a photo polymerized resin having a thickness of 5 $\mu$m. Glass substrate 803 was formed having a diameter of 90 mm, and was rotated at 3600 rpm. A 50 dB C/N ratio is obtained when a 5.8 MHz square wave signal was recorded and read from disk 800. The laser was continuously irradiated at a power of 8 mW. The recording of the magnetic field was modulated at 5.8 MHz and an amplitude of 150 Oe. The reading laser power was 2 mW and the reading magnetic field was 0.

EXAMPLE 4

A 3 MHz square wave signal was overwritten on the recorded marks of the disk used in Example 3. A 55 dB C/N ratio was obtained as a result and an erase rate of the recording marks was less than 40 dB. The next track was set at a pitch of 1.5 $\mu$m and a 5.8 MHz square wave signal was recorded on the track. The cross talk from the next track was less than $-40$ dB.

In the above examples, the photo sensor is divided into four sections. However, a sensor which is divided into more or less than four sections can be used in this recording system. For example, a photo sensor divided into two parts may be used for reading magneto optical signals by taking the difference of each output from the divided parts and setting a polarizer having internal axes that differ from the surface of the next divided part. Furthermore, a photo sensor divided into more than four parts may be used in the system.

In each example of the invention, a photosensor may be provided behind the laser light source for providing feedback to maintain the intensity of light during recording and reading. It provides an output for controlling the laser light source.

By providing an electro magnetic optical head having a recording disk, a slider positioning a laser source towards the surface of recording disk and a photo sensor optically coupled with the laser source, a laser disk having excellent storage quality results. The same quality signal as conventional optical recording systems can be obtained while providing the same or larger recording density than conventional systems. Furthermore, by providing a magnetic coil and magnetic core pole about the laser, the system may be adapted to utilize magneto optical disks thus allowing overwrite on a magneto optical disk. By constructing the recording head of few optical components the system also results in a light recording head and therefore may obtain the same axis speed as hard disk drives. Additionally, the system may be used in conjunction with more than one disk such as hard disk drives so it may provide a large storage capacity and data transfer rate. Furthermore, the invention may be applied to a mass storage system for large computer systems.

It will thus be seen that the objects set forth above, among those apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cove all the generic and specific features of the invention herein described and all statements of the scope of the invention which as a matter of language might be said to fall therebetween.

Particularly it is to be understood that in said claims, ingredients or compounds recited in the singular are intended to include compatible mixtures of such ingredients wherever the sense permits.

What is claimed is:

1. A recording system for recording data on a magneto optical recording disk having a recording surface including a recording layer, comprising:

slider means adjacent to the recording surface of said recording disk and separated from the recording surface by a small distance, the slider means adapted to transverse said disk by transversing towards the center point of the disk and away from the center;

laser light source means mounted adjacent said recording disk on said slider means for projecting a laser light towards said recording layer;

photo-sensor means mounted adjacent said recording disk for receiving the light emitted from the laser source and outputting a signal in response thereto, the recording disk disposed between the laser source means and the photo-sensor means cooperating with the laser source; and magnetic biasing means mounted on the slider means for producing a magnetic field bias causing data to be written on said magneto optical recording disk, said magnetic biasing means including a magnetic pole core integrally formed on the slider means, and a magnetic coil, the magnetic coil being wound about the laser light source means and the magnetic core pole.

2. The recording system of claim 1, further comprising a polarizer disposed between the recording disk and the photosensor means.

3. The recording system of claim 2, wherein the photosensor means is divided into more than two sections and the polarizer means is divided into an equal number of sections, whereby there is a one to one correspondence between polarizer sections and the sensor sections.

4. The recording system of claim 3, wherein the axis of polarization of each polarizing section is different than an adjacent polarizing section.

5. The recording system of claim 3, wherein the divided sections of the photo-sensor means are formed in columns for dividing the section area of said laser light and further comprising data signal composition means, each photo-sensor section providing an output in response to received light from said laser source means, the data signal composition means comparing the difference in outputs between each column and the sum of outputs of each column.

6. The recording system of claim 1, wherein the recording disk includes a transparent substrate having a recording surface on the surface facing the slider means.

* * * * *